(12) United States Patent
Kluttz et al.

(10) Patent No.: US 6,598,161 B1
(45) Date of Patent: Jul. 22, 2003

(54) METHODS, SYSTEMS AND COMPUTER PROGRAM PRODUCTS FOR MULTI-LEVEL ENCRYPTION

(75) Inventors: Karen Ruth Kluttz, Raleigh, NC (US); Sandeep Kishan Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/370,942

(22) Filed: Aug. 9, 1999

(51) Int. Cl.⁷ .............................................. G06F 1/24
(52) U.S. Cl. .................................. 713/166; 713/168
(58) Field of Search .................................. 713/166, 168

(56) References Cited

U.S. PATENT DOCUMENTS

| | | | | |
|---|---|---|---|---|
| 5,689,565 A | * | 11/1997 | Spies et al. | 713/189 |
| 5,742,685 A | * | 4/1998 | Berson et al. | 713/186 |
| 5,787,175 A | * | 7/1998 | Carter | 713/165 |
| 5,903,646 A | * | 5/1999 | Rackman | 705/51 |

* cited by examiner

*Primary Examiner*—Thomas R. Peeso
(74) *Attorney, Agent, or Firm*—Myers Bigel Sibley & Sajovec, P.A.; A. Bruce Clay, Esq.

(57) ABSTRACT

Methods, systems and computer program products are provided which encrypt a document by dividing the document into at least a first portion having a first security level and a second portion having a second security level. The document is then encrypted utilizing at least two encryption keys so as to encrypt the first portion of the document with a first of the at least two encryption keys and so as to encrypt the second portion of the document with a second of the at least two encryption keys. Preferably, the document is sequentially encrypted utilizing at least two encryption keys so as to encrypt the first portion of the document with a first of the at least two encryption keys and so as to encrypt the first and the second portion of the document with a second of the at least two encryption keys. An encrypted document utilizing the encryption techniques of the present invention is also provided as are methods, systems and computer program products for decrypting such documents.

55 Claims, 6 Drawing Sheets

METHODS, SYSTEMS AND COMPUTER PROGRAM PRODUCTS FOR MULTI-LEVEL ENCRYPTION

FIELD OF THE INVENTION

The present invention relates to cryptography and more particularly to the encryption where multiple access rights are provided.

BACKGROUND OF THE INVENTION

With electronic documents, security is often a concern. One conventional way to protect a document is by associating a password or a key with the document and then encrypting the document content with the password or key. Thus, only users with the password or key may decrypt the document contents to view the contents.

However, the conventional encryption of a document typically only provides for a single level of protection. Thus, for example, if portions of a document are only to be viewed by certain authorized users and other portions are to be accessible by a different user or group of users, then it may be necessary, with conventional encryption techniques, to create multiple versions of the document. Each version would then be encrypted with different keys or passwords. Such an approach may be inefficient, time consuming and may, in some cases, compromise security as multiple versions of a secure document may make location and access of the document by an unauthorized party more likely.

One approach to providing different levels of security for a document is described in commonly assigned U.S. patent application Ser. No. 09/240,387 to Fletcher et al., entitled "METHOD, SYSTEM AND APPARATUS FOR SELECTING ENCRYPTION LEVELS BASED ON POLICY PROFILING," the disclosure of which is incorporated herein as if set forth in its entirety. In Fletcher et al. documents are stored in an unencrypted database and different parts of a document are annotated with different security levels. When a request for the document is received a server looks up the requestor and determines which level(s) of information the requester is permitted to access. The server then inspects the document and filters out the content that the requestor is not allowed to access. The content which is not filtered out is then encrypted and provided to the user.

While the approach of Fletcher et al. provides differentiated levels of security for a document without requiring the storage of multiple versions of the document, this approach may be processor intensive as it utilizes a centralized resource to control the dissemination of information in documents. Furthermore, such an approach may be limiting in the event that a document is to be widely distributed, as distribution would involve subsequent interaction with the server to obtain the appropriate version of the document for each recipient in the distribution list.

In light of the above discussion, a need exists for improvements in the encryption of documents which allows for different levels of access to the documents.

SUMMARY OF THE INVENTION

In view of the above discussion, it is an object of the present invention to provide different levels of access to a document.

A further object of the present invention is to provide different levels of access to a document utilizing information contained in the document itself.

Still another object of the present invention is to provide multiple levels of access to a document which may be provided at the time of document generation or upon document access.

These and other objects of the present invention may be provided by methods, systems, and computer program products which encrypt a document by dividing the document into at least a first portion having a first security level and a second portion having a second security level. The document is then encrypted utilizing at least two encryption keys so as to encrypt the first portion of the document with a first of the at least two encryption keys and so as to encrypt the second portion of the document with a second of the at least two encryption keys. Although each portion of the document may be separately encrypted, preferably, the document is sequentially encrypted utilizing at least two encryption keys so as to encrypt the first portion of the document with a first of the at least two encryption keys and so as to encrypt the first and the second portion of the document with a second of the at least two encryption keys.

By separately encrypting portions of a document, the document may be later selectively decrypted to provide different levels of access to the document. Furthermore, by sequentially encrypting a document with separate encryption keys, the document may be decrypted to provide differing levels of access to the document without separately providing information about which portions of the document are encrypted with which encryption keys. Also, because the encryption process is independent of when the document is created, the encryption may be performed at the time of generation of the document or at a later time.

In a further embodiment of the present invention, a set of encryption keys corresponding to the portions of the document to be decrypted by an intended recipient of the document is incorporated into the document. The incorporated set of encryption keys may be encrypted utilizing an encryption key associated with the intended recipient to provide further security. Also, a plurality of sets of encryption keys may be incorporated for different intended recipients. By incorporating the encryption keys into the document, the document may be selectively decrypted without requiring further information about the document. Furthermore, the intended recipients and their respective levels of access may be controlled by controlling the sets of encryption keys that are incorporated into the document. Thus, the document may provide a self-contained mechanism for providing controlled access to the contents of the document.

In a still further embodiment of the present invention, the first portion of the document is decrypted utilizing the first encryption key and the second portion of the document is decrypted utilizing the second encryption key. Preferably, the first and the second portions of the document are decrypted utilizing the second encryption key and the first portion of the document is decrypted utilizing the first encryption key. If the encryption keys are incorporated into the document as a set of encryption keys, then the document may be decrypted utilizing the set of encryption keys incorporated into the document. Furthermore, the set of encryption keys may be decrypted utilizing the encryption key associated with the intended recipient after which the document may be decrypted utilizing the decrypted encryption keys contained within the set of encryption keys.

If a document is sequentially encrypted utilizing encryption keys contained within the set of encryption keys, then the document may be decrypted by sequentially decrypting the document utilizing the decrypted encryption keys in the set of encryption keys. The sequential decryption may be provided in a sequential order in reverse to the sequential order in which the document was encrypted.

In a still further embodiment of the present invention, an encrypted document is provided having a first portion of the document encrypted with a first encryption key and a second portion of the document, different from the first portion, encrypted with both the first encryption key and a second encryption key. The document may also include a third portion of the document which is unencrypted. The document may further include a key area containing at least one of the first encryption key and the second encryption key. If such is the case, then, preferably, the key area is encrypted with a third encryption key. The encrypted document may be a video clip, a word processing document, an audio clip, a spreadsheet, a database and/or a multimedia presentation.

As will further be appreciated by those of skill in the art, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or computer program products for multiple level encryption and/or decryption of documents. As used herein, the term "document" includes a computer file or other stored information which may be partitioned and encrypted. Thus, while the present invention is described with reference to a text document, as will be appreciated by those of skill in the art, other documents may be encrypted or decrypted utilizing the teachings of the present invention. Thus, for example, a video or audio clip may be a document according to the present invention as well as a presentation, graphic, image or other such information sources which may be partitioned into portions associated with a particular security level or access group.

As will be further appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
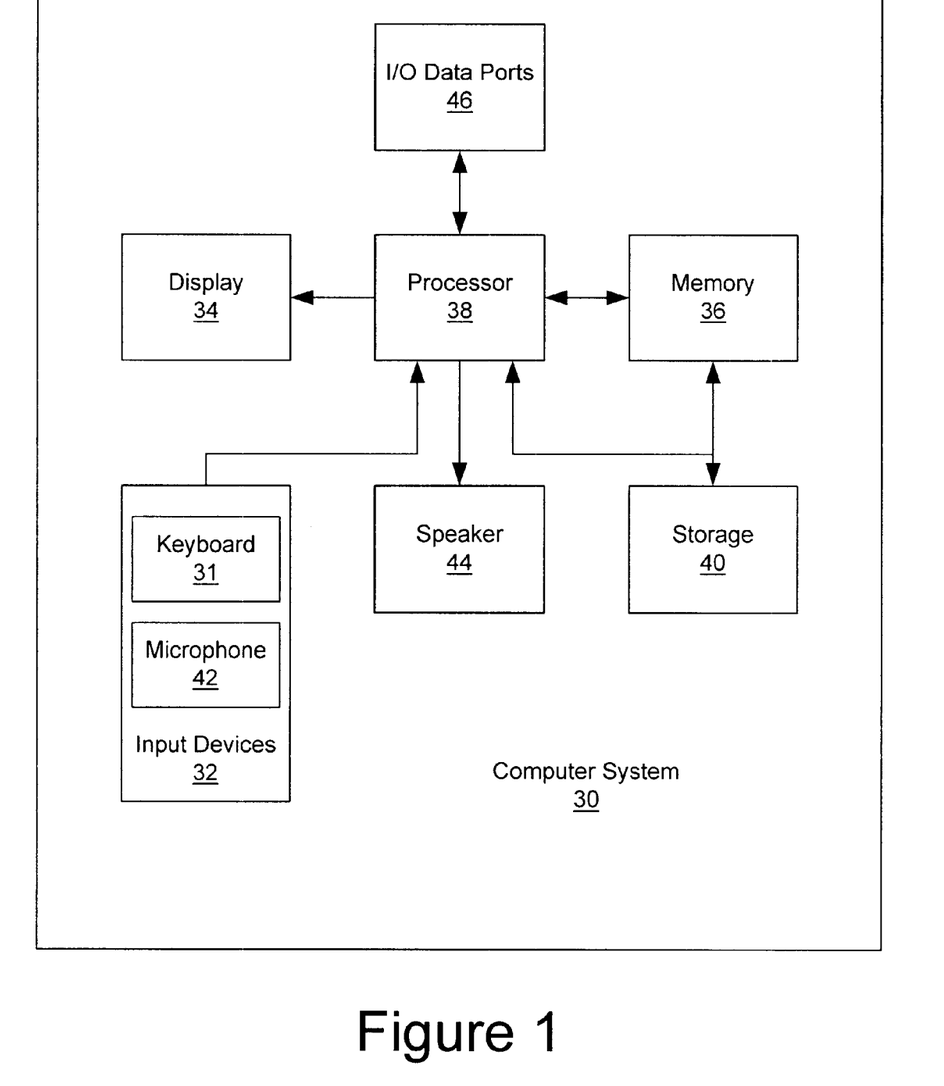
FIG. 1 is diagram of a data processing system incorporating an embodiment of the present invention.

Referring now to FIG. 1, an exemplary embodiment of a computer system 30 in accordance with the present invention typically includes input devices 32, such as a keyboard or keypad 31 and/or a microphone 42. The computer system 30 also preferably includes a display 34 and a memory 36 that communicate with a processor 38. The computer system 30 may further include a speaker 44 and an I/O data port(s) 46 that also communicate with the processor 38. The I/O data ports 46 can be used to transfer information between the computer system 30 and another computer system or a network (e.g., the Internet). FIG. 1 also illustrates that computer system 30 may include a storage device 40 which communicates with memory 36 and processor 38. Such a storage device may be any type of data storage device as described above.

Furthermore, while the present invention is described with respect to the computer system 30, as will be appreciated by those of skill in the art, the present invention may be incorporated into other types of devices where document encryption/decryption may be performed. For example, the present invention may comprise an embedded function in many other devices. Thus, the present invention should not be construed as limited to use in computer systems such as illustrated in FIG. 1 but may be incorporated in any device having sufficient processing capabilities to carry out the operations described below.

Figure 2:
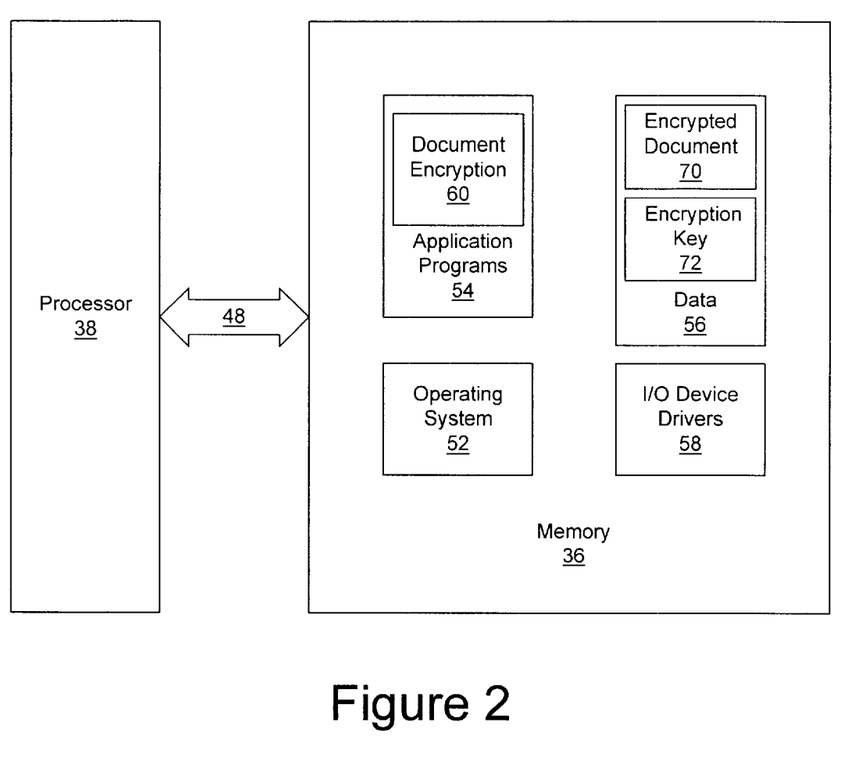
FIG. 2 is a detailed view of a data processing system incorporating an embodiment of the present invention.

FIG. 2 is a more detailed block diagram of the computer system 30 that illustrates one application of the teachings of the present invention. The processor 38 communicates with the memory 36 via an address/data bus 48. The processor 38 can be any commercially available or custom microprocessor or other processing system capable of carrying out the operations of the present invention. The memory 36 is representative of the overall hierarchy of memory devices containing the software and data used to implement the functionality of the computer system 30. The memory 36 can include, but is not limited to, the following types of devices: cache, ROM, PROM, EPROM, EEPROM, flash, SRAM, and DRAM.

As shown in FIG. 2, the memory 36 may hold four major categories of software and data used in the computer system 30: the operating system 52; the application programs 54; the input/output (I/O) device drivers 58; and the data 56. The I/O device drivers 58 typically include software routines accessed through the operating system 52 by the application programs 54 to communicate with devices such as the input devices 32, the display 34, the speaker 44, the microphone 42, the I/O data port(s) 46, and certain memory 36 components.

The application programs 54 comprise programs that implement the various features of the computer system 30 and preferably include at least one application module or object for document encryption/decryption 60 which carries out the operations of the present invention as described below. The data 56 represents the static and dynamic data used by the application programs 54, operating system 52, I/O device drivers 58, and any other software program that may reside in the memory 36. As illustrated in FIG. 2, the data 56 preferably includes an encrypted document 70 and an encryption key 72. Additional intermediate data (not shown) may also be stored in memory. Furthermore, while the present invention is described as an application executing on computer system 30, as will be appreciated by those of skill in the art, the present invention may be implemented in any number of manners, including incorporation in operating system 52 or in an I/O device driver 58.

The present invention will now be described with respect to FIGS. 4 through 6 which are flowchart illustrations of embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

Figure 3:
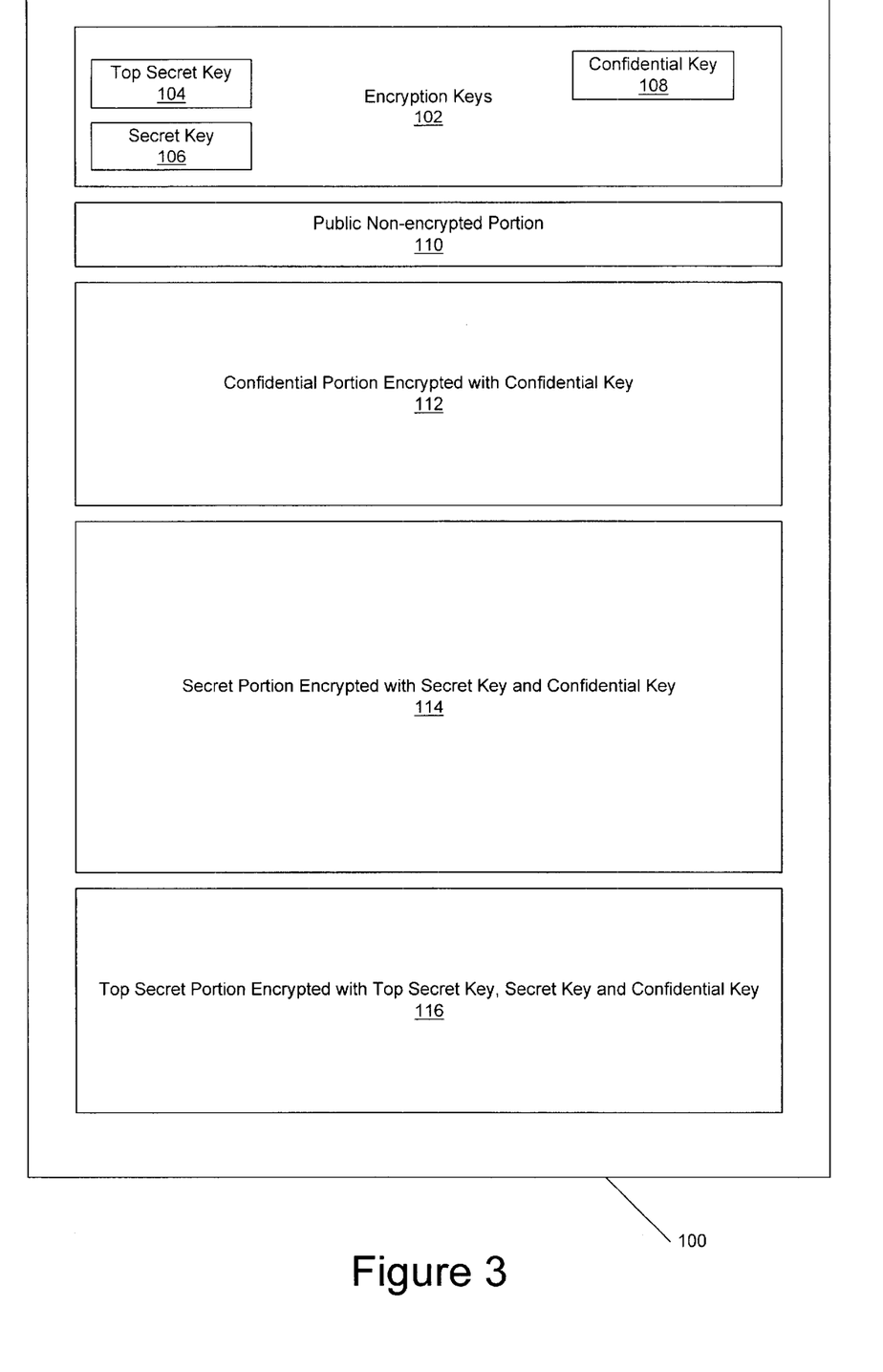
FIG. 3 is an illustration of a document encrypted according to an embodiment of the present invention.

FIG. 3 illustrates the partitioning and encryption of a document having multiple security levels according to one embodiment of the present invention. As is seen in FIG. 3, a document may be partitioned into various portions where each portion is associated with a level of security. For example, as illustrated in FIG. 3, the document 100 is partitioned into four security levels: a public level 110 which may be non-encrypted, a confidential level 112 which is encrypted with an encryption key associated with the confidential level (a confidential key 108), a secret level 114 which is encrypted with an encryption key associated with the secret level (a secret key 106) and a top secret level 116 which is encrypted with an encryption key associated with the top secret level of security (a top secret key 104).

Preferably, each portion of the document 100 is sequentially encrypted with all lower levels of security keys. Thus, for example, the top secret portion 116 of the document 100 would be encrypted with the top secret key 104. The encrypted top secret portion and the unencrypted secret portion of the document 100 are then encrypted with the secret key 106. The encrypted top secret portion, the encrypted secret portion, and the unencrypted confidential portion 112 are then encrypted with the confidential key 108. Thus, the top secret portion 116 may be sequentially encrypted with the top secret key 104, the secret key 106, and the confidential key 108. While the different portions of the document 100 illustrated in FIG. 3 are illustrated as contiguous, each portion may be non-contiguous so that different portions with different levels may be interleaved within the document 100. Furthermore, there may also be multiple security classes associated with a particular level of security, with each security class associated with a different encryption key. The portions of the document at a particular security level may, therefore, be partitioned among the various security classes at that level, and each of these partitions may be separately encrypted using the encryption key corresponding to the associated security class. Therefore, multiple keys may be associated with a particular level of security as well as differing levels of security.

As is also illustrated in FIG. 3, the document 100 also preferably includes an encryption key portion 102 which includes a set of encryption keys which are to be used to decrypt the document by a user. In the example illustrated in FIG. 3, the document 100 would be intended for a recipient with access to the top secret level because all three encryption keys are incorporated in the document 100. The set of encryption keys contained in the key portion of the document will depend on the authority of the user. Thus, a user with top secret clearance would receive all three keys in FIG. 3. A user with secret clearance would receive only the secret 106 and confidential keys 108. A user with confidential clearance would receive only the confidential key 108. A user with no clearance would receive no keys in the encryption key portion 102 of the document. Preferably, the encryption key portion 102 and/or the entire document 100 is also encrypted for delivery to the specific user utilizing a conventional encryption procedure.

Furthermore, while a single key set 102 is illustrated in FIG. 3, multiple sets of keys may be incorporated in document 100. Such sets could be paired with the user identification of the intended recipient. In such a case, each key set could be encrypted with the public key of the intended recipient associated with the key set. In such a way, a single document could be distributed to multiple recipients which would then decrypt the key set encrypted with their public key to further decrypt the document.

Figure 4:
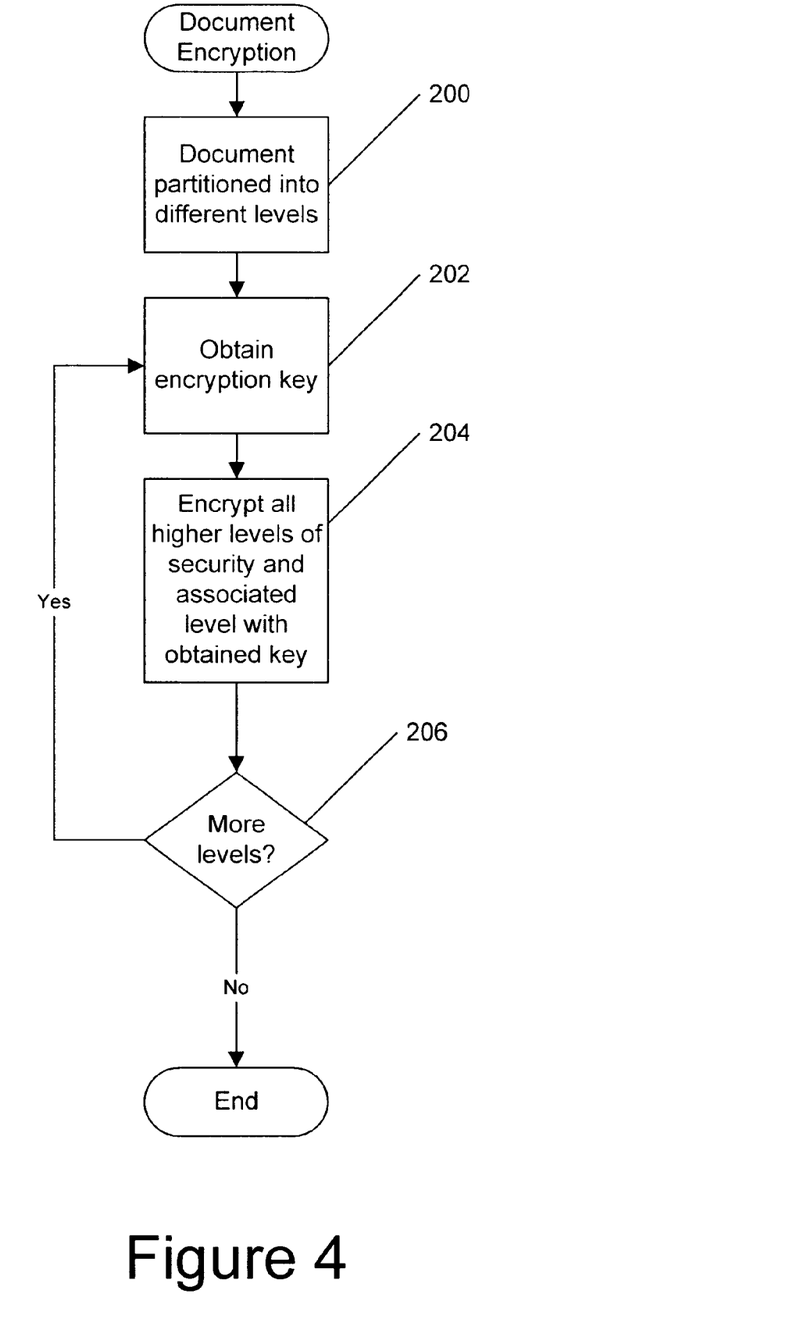
FIG. 4 is a flowchart illustrating operations according to one embodiment of the present invention.

FIG. 4 illustrates operations according to one embodiment of the present invention for encrypting a document as illustrated in FIG. 3. As seen in FIG. 4, a document is partitioned into different levels of encryption (block 200) where portions of the document are associated with the different levels of encryption. This process may be performed at the time that the document is generated or may be performed after the fact. Any suitable method of partitioning the document so that the document may be encrypted based on the partitions may be utilized, for example, by incorporating tags into the document. Other suitable methods of partitioning the document are known to those of skill in the art and need not be described in detail herein. As will be further appreciated by those of skill in the art, the particular partitioning technique may depend on the content of the document. For example, a video or audio clip may be partitioned differently from a text document. Accordingly, the present invention should not be construed as limited to any particular technique for partitioning a document.

Having partitioned the document to be encrypted, the highest level encryption key which has not previously been utilized to encrypt a portion of the document is obtained (block 202) and all portions of the document corresponding to the same or higher level of security of the obtained encryption key are encrypted with the obtained encryption key (block 204). This process is then repeated for each level of security until all portions of the document having a corresponding encryption key have been encrypted (block 206). Thus, as described above, the document is sequentially encrypted with encryption keys corresponding to the levels of security of the differing portions of the document.

Many suitable techniques for encrypting portions of a document, such as for example, with RSA encryption, may be utilized and are known to those of skill in the art. All that is required is that the encryption technique be reversible such that the encrypted portions of the document may be decrypted. The particular method of encryption may depend on the level of security desired for the document. However, the present invention should not be construed as limited to any particular encryption technique.

Figure 5:
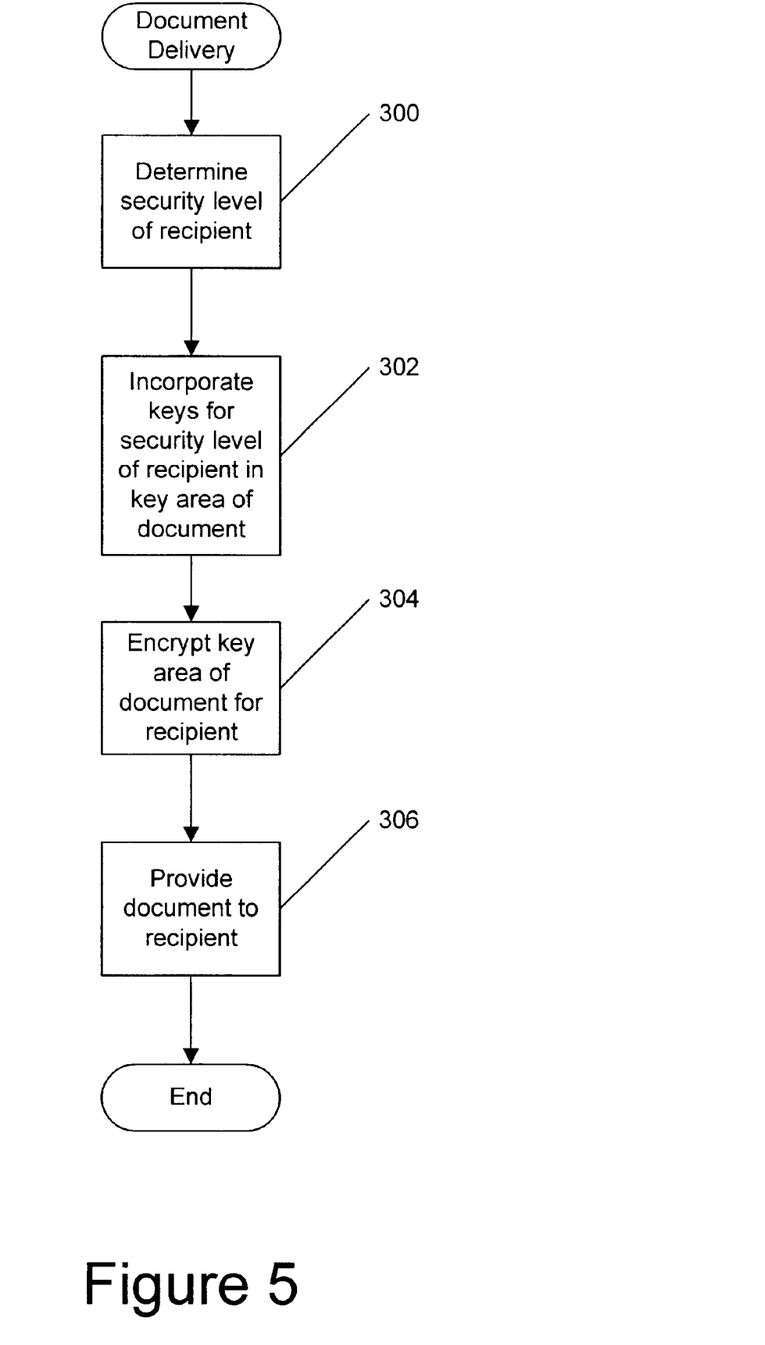
FIG. 5 is a flowchart illustrating operations according to a further aspect of the present invention.

Operations for delivery of the encrypted document to an end user are illustrated in FIG. 5. As seen in FIG. 5, the level of security of the intended recipient of the encrypted document is determined (block 300), for example, based on user identification or password, and the keys corresponding to that level of security and all lower levels of security are incorporated into the document (block 302). Thus, for example, if a recipient of document 100 has a security access authorization of "secret," then the confidential and secret keys would be incorporated into the document. The incorporated keys are then encrypted with a recipient specific key (block 304) and the document provided to the document recipient (block 306). As briefly discussed above, these operations may be carried out in advance and multiple key sets incorporated into the document, with each set associated with a recipient's user identification and encrypted with that recipient's public key.

Figure 6:
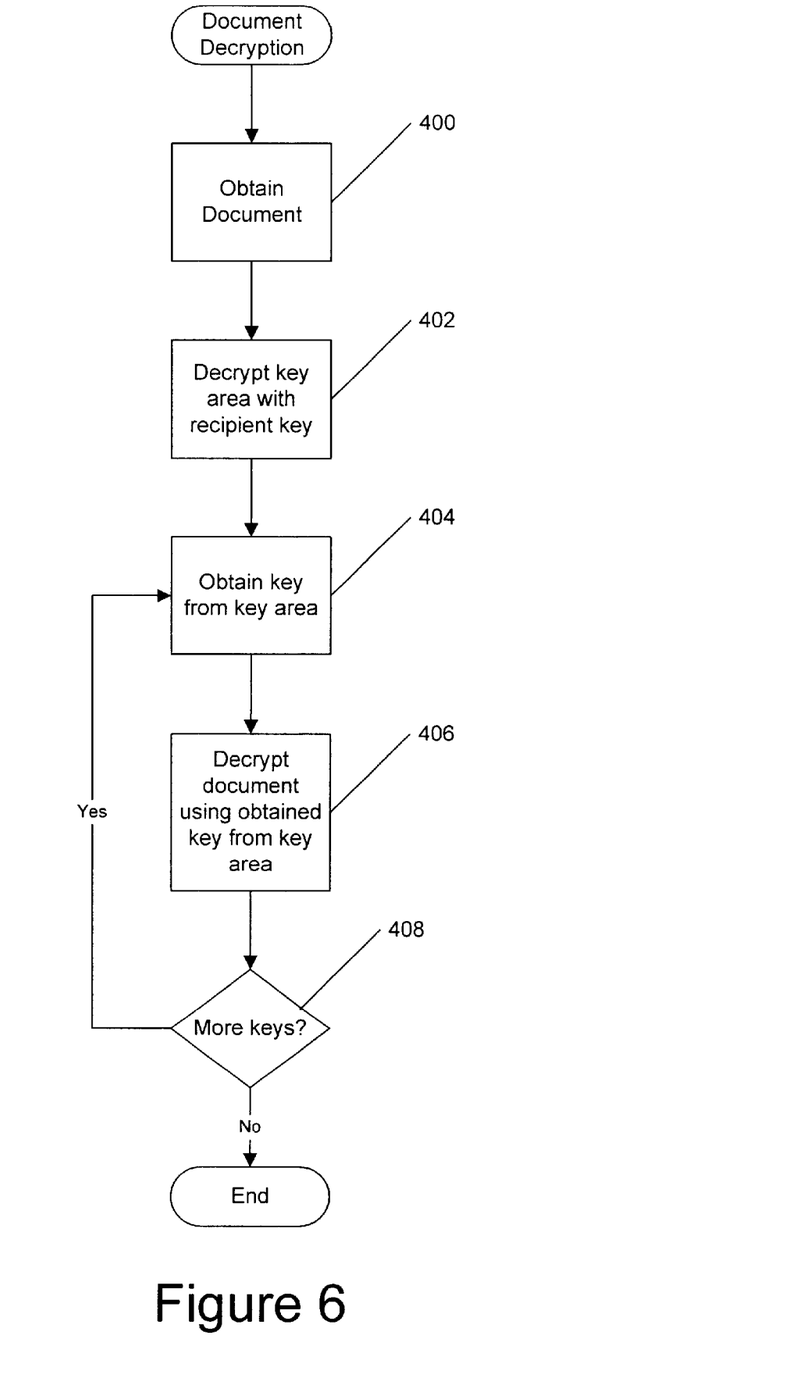
FIG. 6 is a flowchart illustrating operations according to a still further aspect of the present invention.

FIG. 6 illustrates operations performed by a recipient of a document encrypted utilizing the present invention. As seen in FIG. 6, the encrypted document is obtained (block 400) and at least the key area of the document corresponding to the recipient decrypted utilizing the recipient specific key (block 402). The lowest level of security key is then obtained from the key area 102 of the document (block 404) and the remaining encrypted portions of the document are decrypted with this key (block 406). If there are more keys incorporated into the document (block 408), then the next highest key is obtained from the key area 102 of the document and the remaining encrypted portions of the document are decrypted with the next highest key. This process continues until all of the keys in the key area have been utilized to decrypt the document. Thus, the document is decrypted in the reverse sequence to which the document was encrypted to recover the accessible portions of the encrypted original document.

For example, if the document of FIG. 3 is decrypted by a user with top secret access utilizing the operations of FIG. 6, after decryption of the incorporated key set with the user specific key, the remaining encrypted portions of the document would first be decrypted utilizing the confidential key 108 which would allow a user to view the public portion 110 and the confidential portion 112. The remaining encrypted portions of the document would then be decrypted utilizing secret key 106 which would allow the user to view the public portion 110, the confidential portion 112 and the secret portion 114. Finally, the remaining encrypted portion of the document would be decrypted utilizing the top secret key 104 which would allow the user to view all portions of the document 100.

By sequentially encrypting and decrypting selected portions of a document, a user need not know which portions of the document to decrypt with which key but may merely decrypt all remaining encrypted portions successively until all of the available keys have been utilized. For example, this decryption process could be performed by the user selecting the portions of a document which appear to be encrypted and then applying the appropriate encryption keys to decrypt that portion of the document. Thus, the present invention allows for the decryption of differing levels of encryption of a document without knowledge on the part of the decrypting application as to what portions of the document are encrypted at what levels and, therefore, which portions of the document should be accessible. The present invention, therefore, allows for self-contained documents with multiple levels of access. Furthermore, the same basic document may be provided to all users. Such a document could include a plurality of key sets where a particular key set corresponds to an intended recipient or, if a document is constructed for each user, a set of encryption keys corresponding to the user could be provided with the document. Thus, the present invention may facilitate distribution of encrypted documents with different users having different access to the distributed document.

Furthermore, while the present invention has been described with reference to a key area or a pluraltiy of key areas incorporated into the document, as will be appreciated by those of skill in the art, the keys could be provided separately. The keys would still be utilized in the same manner as described herein but would be obtained through a mechanism other than directly from the document. The keys could still be encrypted when provided to the recipient. Users who receive the keys through some secure mechanism may apply the keys to the encrypted portions of the document. This mechanism allows the document to be provided in a format where non-encrypted portions of the document would be viewable without requiring any decryption. If a user did not have a key, the unencrypted portions of the document could still be viewed.

Furthermore, while the present invention has been described with reference to the key area of the document being encrypted with a key associated with the intended recipient, as will be appreciated by those of skill in the art, the entire document could be encrypted with such a key. In such a case, the entire document would then be decrypted prior to application of the encryption keys incorporated into the document.

Also, an intended recipient need not be limited to an individual, but may be a group of individuals, or other entity which has associated with it access rights to a particular document. Thus, for example, a development team having several developers in the group may be considered one intended recipient and utilize a common public key and a marketing team having several members may be considered another intended recipient and have a different common public key. Accordingly, the present invention should not be construed as limited to individual intended recipients.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of controlling access to a document, the method comprising the steps of:
   dividing the document into a t least a first portion having a first security level and a second portion having a second security level; and
   encrypting the document utilizing at least two encryption keys so as to encrypt the first portion of the document with a first of the at least two encryption keys and so as to encrypt the second portion of the document with a second of the at least two encryption keys.

2. A method according to claim 1, wherein the step of encrypting comprises the step of sequentially encrypting the document utilizing the at least two encryption keys so as to encrypt the first portion of the document with the first of the at least two encryption keys and so as to encrypt the first and the second portions of the document with the second of the at least two encryption keys.

3. A method according to claim 1, further comprising the step of incorporating in the document at least one of the at least two encryption keys as a set of encryption keys corresponding to the portions of the document to be decrypted by an intended recipient of the document.

4. A method according to claim 3, further comprising the step of encrypting the incorporated set of encryption keys utilizing an encryption key associated with the intended recipient.

5. A method according to claim 4, wherein the document further comprises a plurality of key sets with each set corresponding to an intended recipient and wherein the step of encrypting the incorporated set of encryption keys comprises the step of encrypting each of the plurality of key sets with a key associated with the intended recipient corresponding to each set of encryption keys.

6. A method according to claim 1, further comprising the steps of:
   decrypting the first portion of the document utilizing the first of the at least two encryption keys; and
   decrypting the second portion of the document utilizing the second of the at least two encryption keys.

7. A method according to claim 2, further comprising the steps of:
   decrypting the first and the second portions of the document utilizing the second of the at least two encryption keys; and then
   decrypting the first portion of the document utilizing the first of the at least two encryption keys.

8. A method according to claim 3, further comprising the step of decrypting the document utilizing the set of encryption keys incorporated into the document.

9. A method according to claim 4, further comprising the steps of:
   decrypting the set of encryption keys utilizing the encryption key associated with the intended recipient; and
   decrypting the document utilizing encryption keys in the decrypted set of encryption keys.

10. A method according to claim 9, wherein the document further comprises a plurality of encrypted key sets with each set corresponding to an intended recipient and wherein the step of decrypting is preceded by the step of locating within the document the encrypted key set corresponding to the intended recipient.

11. A method according to claim 9, wherein the document is sequentially encrypted utilizing encryption keys in the set of encryption keys and wherein the step of decrypting the document comprises the step of sequentially decrypting the document utilizing the encryption keys in the decrypted set of encryption keys in a sequential order in reverse to the sequential order in which the document was encrypted.

12. An encrypted document comprising:
   a first portion of the document encrypted with a first encryption key; and
   a second portion of the document, different from the first portion, encrypted with both the first encryption key and a second encryption key.

13. An encrypted document according to claim 12, further comprising a third portion of the document which is unencrypted.

14. An encrypted document according to claim 12, further comprising a key area containing at least one of the first encryption key and the second encryption key.

15. An encrypted document according to claim 14, wherein the key area is encrypted with a third encryption key.

16. An encrypted document according to claim 12, further comprising a plurality of key areas, each key area corresponding to an intended recipient.

17. An encrypted document according to claim 16, wherein each of the plurality of key areas is encrypted with an encrypted key associated with the intended recipient corresponding to the key area.

18. An encrypted document according to claim 12, wherein the document comprises at least one of a video clip, a word processing document, an audio clip, a spreadsheet, a database and a multimedia presentation.

19. A system for encrypting a document, comprising:
   means for dividing the document into at least a first portion having a first security level and a second portion having a second security level; and
   means for encrypting the document utilizing at least two encryption keys so as to encrypt the first portion of the document with a first of the at least two encryption keys and so as to encrypt the second portion of the document with a second of the at least two encryption keys.

20. A system according to claim 19, wherein the means for encrypting comprises means for sequentially encrypting the document utilizing the at least two encryption keys so as to encrypt the first portion of the document with the first of the at least two encryption keys and so as to encrypt the first and the second portions of the document with the second of the at least two encryption keys.

21. A system according to claim 19, further comprising means for incorporating in the document at least one of the at least two encryption keys as a set of encryption keys corresponding to the portions of the document to be decrypted by an intended recipient of the document.

22. A system according to claim 21, further comprising means for encrypting the incorporated set of encryption keys utilizing an encryption key associated with the intended recipient.

23. A system according to claim 22, wherein the document further comprises a plurality of key sets with each set corresponding to an intended recipient and wherein the means for encrypting the incorporated set of encryption keys comprises means for encrypting each of the plurality of key sets with a key associated with the intended recipient corresponding to each set of encryption keys.

24. A system according to claim 19, further comprising:
   means for decrypting the first portion of the document utilizing the first of the at least two encryption keys; and
   means for decrypting the second portion of the document utilizing the second of the at least two encryption keys.

25. A system according to claim 20, further comprising:
   means for decrypting the first and the second portion of the document utilizing the second of the at least two encryption keys; and
   means for decrypting the first portion of the document utilizing the first of the at least two encryption keys.

26. A system according to claim 21, further comprising means for decrypting the document utilizing the set of encryption keys incorporated into the document.

27. A system according to claim 22, further comprising:
   means for decrypting the set of encryption keys utilizing the encryption key associated with the intended recipient; and
   means for decrypting the document utilizing the encryption keys in the decrypted set of encryption keys.

28. A system according to claim 27, wherein the document further comprises a plurality of encrypted key sets with each set corresponding to an intended recipient, the system further comprising means for locating within the document the encrypted key set corresponding to the intended recipient.

29. A system according to claim 27, wherein the document is sequentially encrypted utilizing encryption keys in the set of encryption keys and wherein the means for decrypting the document comprises means for sequentially decrypting the document utilizing the decrypted encryption keys in the set of encryption keys in a sequential order in reverse to the sequential order in which the document was encrypted.

30. A computer program product for encrypting a document, comprising:
   a computer readable storage medium having computer readable program code embodied in said medium, said computer readable program code comprising:
   computer readable program code for dividing the document into at least a first portion having a first security level and a second portion having a second security level; and
   computer readable program code for encrypting the document utilizing at least two encryption keys so as to encrypt the first portion of the document with a first of the at least two encryption keys and so as to encrypt the second portion of the document with a second of the at least two encryption keys.

31. A computer program product according to claim 30, wherein the computer readable program code for encrypting comprises computer readable program code for sequentially encrypting the document utilizing the at least two encryption keys so as to encrypt the first portion of the document with the first of the at least two encryption keys and so as to encrypt the first and the second portion of the document with the second of the at least two encryption keys.

32. A computer program product according to claim 30, further comprising computer readable program code for incorporating in the document at least one of the at least two encryption keys as a set of encryption keys corresponding to the portions of the document to be decrypted by an intended recipient of the document.

33. A computer program product according to claim 32, further comprising computer readable program code for encrypting the incorporated set of encryption keys utilizing an encryption key associated with the intended recipient.

34. A computer program product according to claim 33, wherein the document further comprises a plurality of key sets with each set corresponding to an intended recipient and wherein the computer readable program code for encrypting the incorporated set of encryption keys comprises computer readable program code for encrypting each of the plurality of key sets with a key associated with the intended recipient corresponding to each set of encryption keys.

35. A computer program product according to claim 30, further comprising:
   computer readable program code for decrypting the first portion of the document utilizing the first of the at least two encryption keys; and
   computer readable program code for decrypting the second portion of the document utilizing the second of the at least two encryption keys.

36. A computer program product according to claim 31, further comprising:
   computer readable program code for decrypting the first and the second portion of the document utilizing the second of the at least two encryption keys; and
   computer readable program code for decrypting the first portion of the document utilizing the first of the at least two encryption keys.

37. A computer program product according to claim 32, further comprising computer readable program code for decrypting the document utilizing the set of encryption keys incorporated into the document.

38. A computer program product according to claim 33, further comprising:
   computer readable program code for decrypting the set of encryption keys utilizing the encryption key associated with the intended recipient; and
   computer readable program code for decrypting the document utilizing the encryption keys in the decrypted set of encryption keys.

39. A computer program product according to claim 38, wherein the document further comprises a plurality of encrypted key sets with each set corresponding to an intended recipient, the computer program product further comprising computer readable program code for locating within the document the encrypted key set corresponding to the intended recipient.

40. A computer program product according to claim 38, wherein the document is sequentially encrypted utilizing encryption keys in the set of encryption keys and wherein the computer readable program code for decrypting the document comprises computer readable program code for sequentially decrypting the document utilizing the decrypted encryption keys in the set of encryption keys in a sequential order in reverse to the sequential order in which the document was encrypted.

41. A method of decrypting an encrypted document to provide multiple levels of access to contents of the document, the method comprising:
   decrypting a first portion of the document utilizing a first encryption key to provide a first level of access to the contents of the document; and
   decrypting a second portion of the document utilizing a second encryption key to provide a second level of access to the contents of the document.

42. A method according to claim 41, wherein the step of decrypting a second portion of the document utilizing a second encryption key is preceded by the step of decrypting the second portion of the document utilizing the first encryption key.

43. A method according to claim 41, wherein at least one of the first and second encryption keys are contained in the document as a set of encryption keys.

44. A method according to claim 43, further comprising the step of decrypting the set of encryption keys utilizing an encryption key associated with an intended recipient so as to provide the first and second encryption keys.

45. A method according to claim 44, wherein the document is sequentially encrypted utilizing the first and second encryption keys in the set of encryption keys and wherein the step of decrypting the document comprises the step of sequentially decrypting the document utilizing the decrypted encryption keys in the set of encryption keys in a sequential order in reverse to a sequential order in which the document was encrypted.

46. A system for decrypting an encrypted document to provide multiple levels of access to contents of the document, comprising:

means for decrypting a first portion of the document utilizing a first encryption key to provide a first level of access to the contents of the document; and means for decrypting a second portion of the document utilizing a second encryption key to provide a second level of access to the contents of the document.

47. A system according to claim 46, wherein the means for decrypting a second portion of the document utilizing a second encryption key further comprises means for decrypting the second portion of the document utilizing the first encryption key.

48. A system according to claim 46, wherein at least one of the first and second encryption keys are contained in the document as a set of encryption keys.

49. A system according to claim 48 further comprising means for decrypting the set of encryption keys utilizing an encryption key associated with an intended recipient so as to provide the first and second encryption keys.

50. A system according to claim 49, wherein the document is sequentially encrypted utilizing the first and second encryption keys in the set of encryption keys and wherein the means for decrypting the document comprises means for sequentially decrypting the document utilizing the decrypted encryption keys in the set of encryption keys in a sequential order in reverse to a sequential order in which the document was encrypted.

51. A computer program product for decrypting an encrypted document to provide multiple levels of access to contents of the document, comprising:

a computer readable storage medium having computer readable program code embodied in said medium, said computer readable program code comprising:

computer readable program code for decrypting a first portion of the document utilizing a first encryption key to provide a first level of access to the contents of the document; and computer readable program code for decrypting a second portion of the document utilizing a second encryption key to provide a second level of access to the contents of the document.

52. A computer program product according to claim 51, wherein the computer readable program code for decrypting a second portion of the document utilizing a second encryption key further comprises computer readable program code for decrypting the second portion of the document utilizing the first encryption key.

53. A computer program product according to claim 51, wherein at least one of the first and second encryption keys are contained in the document as a set of encryption keys.

54. A computer program product according to claim 53, further comprising computer readable program code for decrypting the set of encryption keys utilizing an encryption key associated with an intended recipient so as to provide the first and second encryption keys.

55. A computer program product according to claim 54, wherein the document is sequentially encrypted utilizing the first and second encryption keys in the set of encryption keys and wherein the computer readable program code for decrypting the document comprises computer readable program code for sequentially decrypting the document utilizing the decrypted encryption keys in the set of encryption keys in a sequential order in reverse to a sequential order in which the document was encrypted.

* * * * *